(12) United States Patent
Ivanov et al.

(10) Patent No.: US 11,385,096 B2
(45) Date of Patent: Jul. 12, 2022

(54) AIRFLOW CALIBRATOR

(71) Applicant: SENSIDYNE, L.P., St. Petersburg, FL (US)

(72) Inventors: Stanislav Ivanov, St. Petersburg, FL (US); William Evan Flanery, Largo, FL (US); Oliver Justin Parker, St. Petersburg, FL (US); Richard Terrence Reo, Bradenton, FL (US)

(73) Assignee: Sensidyne, L.P., St. Petersburg, FL (US)

( * ) Notice: Subject to any disclaimer, the term of this patent is extended or adjusted under 35 U.S.C. 154(b) by 424 days.

(21) Appl. No.: 16/613,698

(22) PCT Filed: May 15, 2018

(86) PCT No.: PCT/US2018/032702
§ 371 (c)(1),
(2) Date: Nov. 14, 2019

(87) PCT Pub. No.: WO2018/213268
PCT Pub. Date: Nov. 22, 2018

(65) Prior Publication Data
US 2020/0166399 A1 May 28, 2020

Related U.S. Application Data

(60) Provisional application No. 62/506,331, filed on May 15, 2017.

(51) Int. Cl.
*G01F 25/10* (2022.01)
*G01F 1/28* (2006.01)
*G01F 1/7086* (2022.01)

(52) U.S. Cl.
CPC ............... *G01F 25/15* (2022.01); *G01F 1/28* (2013.01); *G01F 1/7086* (2013.01)

(58) Field of Classification Search
CPC .......... G01F 25/15; G01F 1/28; G01F 1/7086
USPC ........................................................ 73/1.19
See application file for complete search history.

(56) References Cited

U.S. PATENT DOCUMENTS

| | | | |
|---|---|---|---|
| 3,953,152 A | 4/1976 | Sipin | |
| 5,440,925 A * | 8/1995 | Padden | G01F 3/16 73/239 |
| 5,551,311 A * | 9/1996 | Ogden | G01N 1/24 422/430 |
| 2004/0060308 A1* | 4/2004 | Yoshizawa | F25B 41/26 62/228.3 |
| 2015/0323365 A1* | 11/2015 | Adachi | G01F 15/07 702/45 |

* cited by examiner

*Primary Examiner* — Nathaniel T Woodward
(74) *Attorney, Agent, or Firm* — Dentons Cohen & Grigsby P.C.

(57) ABSTRACT

An airflow calibrator 10 may generally comprise an inlet 15 in fluid communication with an outlet 20 to define a flow path 30 of a fluid through the airflow calibrator 10; a face seal valve 40 in fluid communication with the inlet 15; a removable flow cell 50 in fluid communication with the face seal valve 40; a variable restrictor valve 60 in fluid communication with the removable flow cell 50; and an optical sensor array 70 to determine the airflow, i.e., flow rate, of an air sampling pump in fluid communication with the airflow calibrator. Methods of using the airflow calibrator are also described.

15 Claims, 5 Drawing Sheets

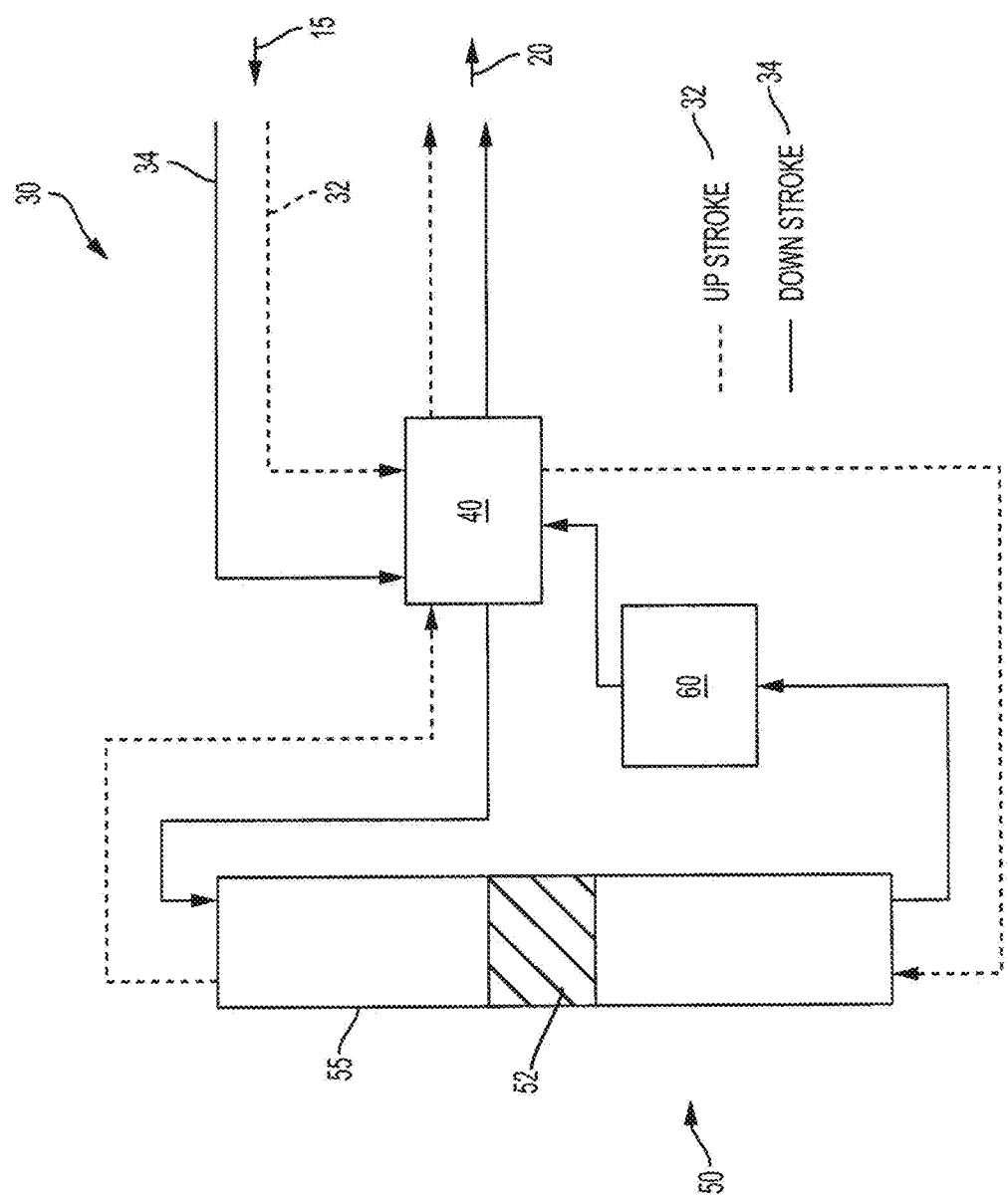

AIRFLOW CALIBRATOR

CROSS REFERENCE TO RELATED APPLICATION

This application is a national phase application of International Application No. PCT/US2018/032702, filed May 15, 2018, which claims the benefit under 35 U.S.C. § 119(e) of U.S. Provisional Application No. 62/506,331 filed May 15, 2017, having the title AIRFLOW CALIBRATOR, the disclosure of each of which is incorporated herein by reference in its entirety.

FIELD OF INVENTION

The present invention relates to an airflow calibrator as well as methods of making and using the same.

BACKGROUND

Flow samplers may be used to monitor environments where the ambient air may be contaminated and/or hazardous. Typically, such devices include a source of vacuum, e.g., a pump, whereby the airborne contaminants may be drawn across a sample collection medium into the device through the action of the pump. In addition, these samplers may also be used to inject an air stream into a sample collection medium. Flow samplers may be tested and calibrated using airflow calibrators to ensure that such flow samplers meet performance specifications. The airflow calibrators may analyze pump performance, check pump calibration, simulate loads, and/or verify flow sampler flow rates. Accordingly, an airflow calibrator having minimal impact on the airflow being measured may be desirable.

DESCRIPTION OF FIGURES

The present invention may be better understood by reference to the accompanying figures, in which:

FIG. 6 illustrates a flow path of an airflow calibrator according to the present invention.

DETAILED DESCRIPTION

Figure 1:
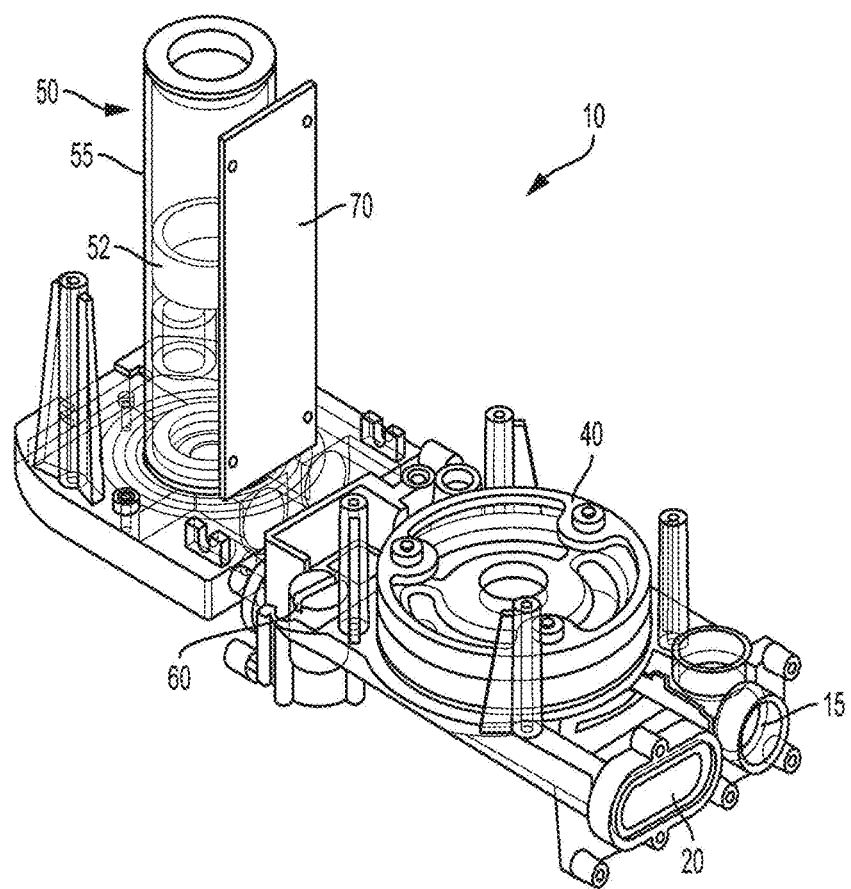
FIG. 1 illustrates an airflow calibrator valve and flow detector according to the present invention.

All numerical quantities stated herein are approximate, unless indicated otherwise, and are to be understood as being prefaced and modified in all instances by the term "about". The numerical quantities disclosed herein are to be understood as not being strictly limited to the exact numerical values recited. Instead, unless indicated otherwise, each numerical value included in this disclosure is intended to mean both the recited value and a functionally equivalent range surrounding that value.

All numerical ranges recited herein include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value equal to or less than 10.

As generally used herein, the articles "one", "a", "an", and "the" include "at least one" or "one or more" of what is claimed or described, unless indicated otherwise. For example, "a component" means one or more components, and thus, possibly, more than one component is contemplated and may be employed or used in an implementation of the described embodiments.

As generally used herein, the terms "include", "includes", and "including" are meant to be non-limiting.

As generally used herein, the terms "have", "has", and "having" are meant to be non-limiting.

As generally used herein, the term "characterized by" is meant to be non-limiting.

An airflow calibrator according to the present invention may generally comprise a flow path comprising a multi-positional face seal valve, a variable restrictor valve, and one or more removable flow cells, and a transmissive linear optical sensor array and/or reflective linear optical sensor array. The airflow calibrator may comprise an inlet and outlet. The flow path may be switched between the inlet and outlet by the multi-positional face seal valve. The variable restrictor valve may minimize pressure drop and/or hold the pressure drop substantially constant throughout the flow path of the airflow calibrator.

The flow of gas through the flow path may pass through a sensor element of the removable flow cell. The sensor element may comprise a transparent flow tube including the piston or soap bubble to define a position in a cylindrical volume of gas. Without wishing to be bound to any particular theory, the movement of the piston or soap bubble in the flow tube may be sequentially timed to measure flow rate. For example, the sensor element may comprise a borosilicate glass tube having a circular cross-section and a tightly fitted piston having a slightly smaller cross-section to minimize bypass airflow and a very low resistance to motion. The piston may be lightweight to minimize the pressure required to move it within the borosilicate glass tube when rising and falling in an axial direction. The pressure arising from the weight of the piston may be less than the pressure capability of the flow source and/or less than one inch of water to provide for an accurate measurement.

The reflective linear optical sensor array and/or transmissive linear optical sensor array may precisely detect the movement of the piston or soap bubble at high velocities in the flow tube to provide accurate flow rate measurements. The sensor array may comprise a photo-sensor array of two or more positions. Each photo-sensor array position may comprise photo-sensor emitter(s) to emit light and photo-sensor detectors to detect the light. The photo-sensor detector may detect the movement of the piston or soap bubble when the piston or soap bubble interrupts the light emitted from the photo-sensor emitters. The sensor array may be characterized by improved alignment and stability of the photo-sensor emitters and/or photo-sensor detectors relative to conventional transmission beam break photo-sensor detectors.

The airflow calibrator according to the present invention may provide an advantage relative to conventional airflow calibrators by reducing and/or eliminating undesirable irregularities or pulsations in the flow that may affect the accuracy of the measurement or the flow sampler being measured. The airflow calibrator according to the present invention may comprise an airflow measuring system configured to use precisely defined volumes of gas and transit times of a piston or soap bubble through the defined volume of gas to precisely measure airflow over a wide range of flowrates, e.g., 0.001-50 L/min. The airflow calibrator may be configured to use higher flowrates or lower flowrates, as may be desirable.

An airflow calibrator according to the present invention may be in fluid communication with a flow sampler to be tested and calibrated. For example, the flow sampler may be in fluid communication with an inlet of the airflow calibrator. The flow sampler may comprise a pump to direct a flow of fluid through the airflow calibrator at a flow rate to be measured by the airflow calibrator. The fluid may comprise air, such as ambient air or atmospheric air. The flow rate may be determined by timing the displacement of a piston or soap bubble over a fixed distance as described herein. The airflow calibrator may be characterized by a flow rate from 1 mL/min to 50 L/min and a leak rate (through all flow paths) less than one percent (1%) of the measured flow rate to achieve an accuracy of at least one percent (1%).

Referring to FIG. 1, the airflow calibrator 10 may generally comprise an inlet 15 in fluid communication with an outlet 20 to define a flow path 30 of a fluid through the airflow calibrator 10; a face seal valve 40 in fluid communication with the inlet 15; a removable flow cell 50 in fluid communication with the face seal valve 40; a variable restrictor valve 60 in fluid communication with the removable flow cell 50; and an optical sensor array 70 to determine the airflow, i.e., flow rate, of the flow sampler (not shown). The removable flow cell 50 may include a piston 52 disposed and moveable in at least one axial direction within a flow tube 55. The airflow calibrator 10 may comprise a light source (not shown) to illuminate the piston 52 within the flow tube 55. The optical sensor array 70 may comprise a plurality of optical sensors positioned along the flow tube 55 spaced a fixed distance apart to measure the displaced transit time of the leading and/or trailing edge of the piston 52 as it moves along the flow tube 55. The piston 52 may interrupt the light source being detected by the plurality of optical sensors as the piston 52 moves along the flow tube 55. Without wishing to be bound to any particular theory, the flow rate may be determined based on displaced transit time of the piston 52.

Figure 2:
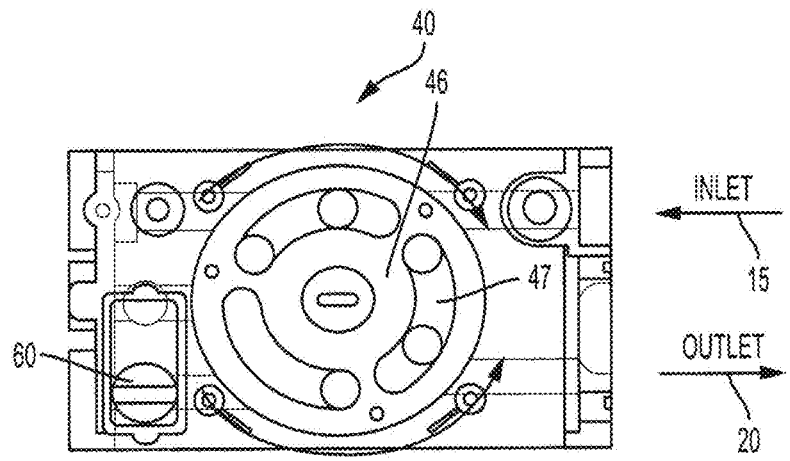
FIG. 2 illustrates a face seal valve according to the present invention.

Referring to FIG. 2, the face seal valve 40 may generally comprise a fixed flat plate, i.e., stator plate, 47 having openings for airflow to enter (an inlet) and exit (an outlet) and a matched flat interconnect plate, i.e., a rotor plate, 46 rotatable among at least a first position, a second position, and a third position. The openings of the stator plate 47 may comprise a first port, a second port, and a third port. Depending on the rotary position of the rotor plate 46, the airflow along the flow path 30 may be directed through the flow tube (not shown) in either direction or to bypass the flow tube (not shown). For example, the airflow along the flow path 30 may be directed through the first port 47a of the stator plate 47 to a top end of the flow tube when the rotor plate 46 is in the first position. The airflow along the flow path 30 may be directed through the second port 47b of the stator plate 47 to a bottom end of the flow tube when the rotor plate 46 is in the second position. The airflow along the flow path 30 may be directed through the third port 47c of the stator plate 47 to bypass the flow tube when the rotor plate 46 is in the third position. The stator plate 47 and rotor plate 46 may comprise different materials. For example, the stator plate 47 may comprise burnished brass and the rotor plate 46 may comprise high density nonporous graphite. The stator plate 47 and rotor plate 46 may burnish each other when in operation to maintain a substantially flat, close fit to reduce and/or eliminate leakage to a leak rate up to one percent (1%).

The face seal valve may be configured to support fixed operation of unidirectional flow sensor technologies, such as bubble tubes, for example. The face seal may be characterized by compact integration of large, low resistance gas passageways and fast switching to allow for short fast (high flow) measurements and long low leakage strokes (low flow).

The face seal valve may provide one or more of the following advantages relative to conventional airflow calibrators: the ability to make continuous measurements by not stopping to drop the piston to begin a new measurement, which may avoid damage to the piston from impacting the ends of the flow tube when the piston is allowed to fall; allow a gradual change of airflow direction to minimize sudden backpressure changes as when a solenoid valve is used; allow precise control of gas flow switching to provide little or no effect on flow through the airflow calibrator such that the speed of the switching and piston sensing element may be controlled; and no change in gas volume, and therefore, no pumping of the flow caused by the valve. The airflow calibrator may be characterized by measuring flow rate when the piston is moving in both directions to provide a substantially 100% complete sample of the time the flow rate is measured. The airflow calibrator measures the flow rate at least 90%, at least 95%, at least 99%, and up to 100% of the flow time because the variable restrictor valve regulates the back pressure of the flow cell.

In use, as described above, the face seal valve may adjust the flow path of the airflow to pass alternately in either direction through the flow tube. The position of the piston may be detected to measure the flow in both rising and falling parts of the cycle. The face seal valve may be characterized by a constant internal volume while switching the direction of the flow such that little, if any, pumping action is added to the sample stream. The ability to switch directions with a low and unchanging flow resistance makes it possible to make accurate measurements of flows generated by sources, such as air sampling pumps, that compensate or react to flow resistance changes. The constant pressure may be configured to accommodate measuring flow in streams where flow is set by a resistance element, such as a constant pressure source, with a variable resistance valve, such as a needle valve.

Figure 3:
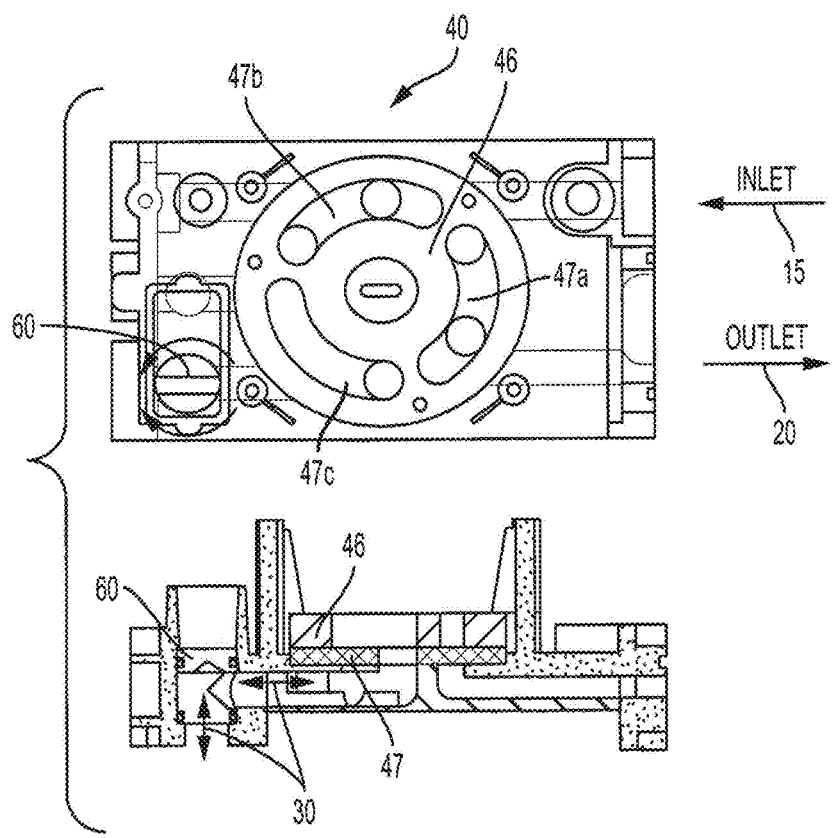
FIG. 3 illustrates a restrictor valve according to the present invention.

Referring to FIG. 3, the variable restrictor valve 60 may generally comprise an adjustable orifice. Any design variable orifice having an appropriate resistance may be used. For example, the adjustable orifice may comprise a rotary actuator having a movable central core that may be turned to adjust the overlap of its moveable orifice with a fixed orifice to establish the desired flow resistance. The adjustable orifice may be controlled by a rotary power source, such as a servo, motor, or other torque device, for example, which may be communicatively connected to a controller. The variable restrictor valve may control a pressure of the removable flow cell, and in particular, the flow tube. The variable restrictor valve may be movable between at least one of a first position and a second position.

In use, when the flow cell generates a resistance, it may result in a back pressure. The resistance created by the back pressure may not be generally significant to the flow source, i.e., the pump of the flow sampler, but variation of this resistance may be problematic when calibrating flow-controlled flow generators. The resistance may be generated by the flow cell when the piston's direction is in a positive direction (lifting the piston in an upward direction towards the top end of the flow tube), and the resistance may be reduced when the flow valve position is changed to move the piston in a negative direction (piston descending in a downward direction towards the bottom end of the flow tube). The resistance variation may result in the flow source, such as an air sampling pump, for example, reacting to maintain a constant rate of airflow. The variable resistance restrictor valve may be adjusted to provide a constant load on the airflow such that the flow source does not substantially react to the resistance variation. Without wishing to be bound to any particular theory, the variable resistance restrictor valve may reduce or prevent the resistance variation from destabilizing the flow source.

The variable restrictor valve according to the present invention may provide one or more of the following advantages: a constant flow resistance to provide a generally constant resistance load to flow; and/or a minimal effect on flow generator which may provide a more accurate measurement. Without wishing to be bound to any particular theory, as discussed above, the variable restrictor valve may reduce and/or eliminate irregularities or pulsations in the airflow by regulating the back pressure of the removable flow cell.

Figure 4:
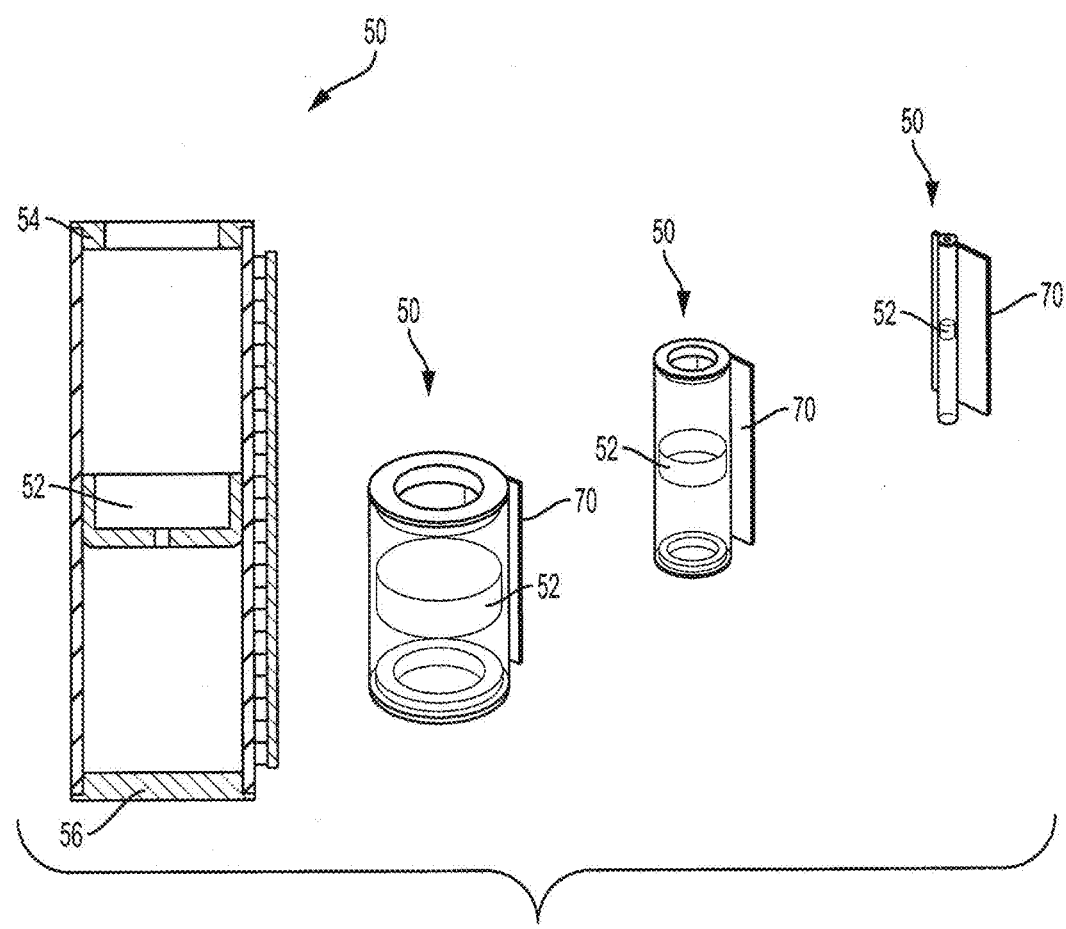
FIG. 4 illustrates a reflective optical sensor array and a flow cell including a piston and cylindrical flow tube according to the present invention.
Figure 5:
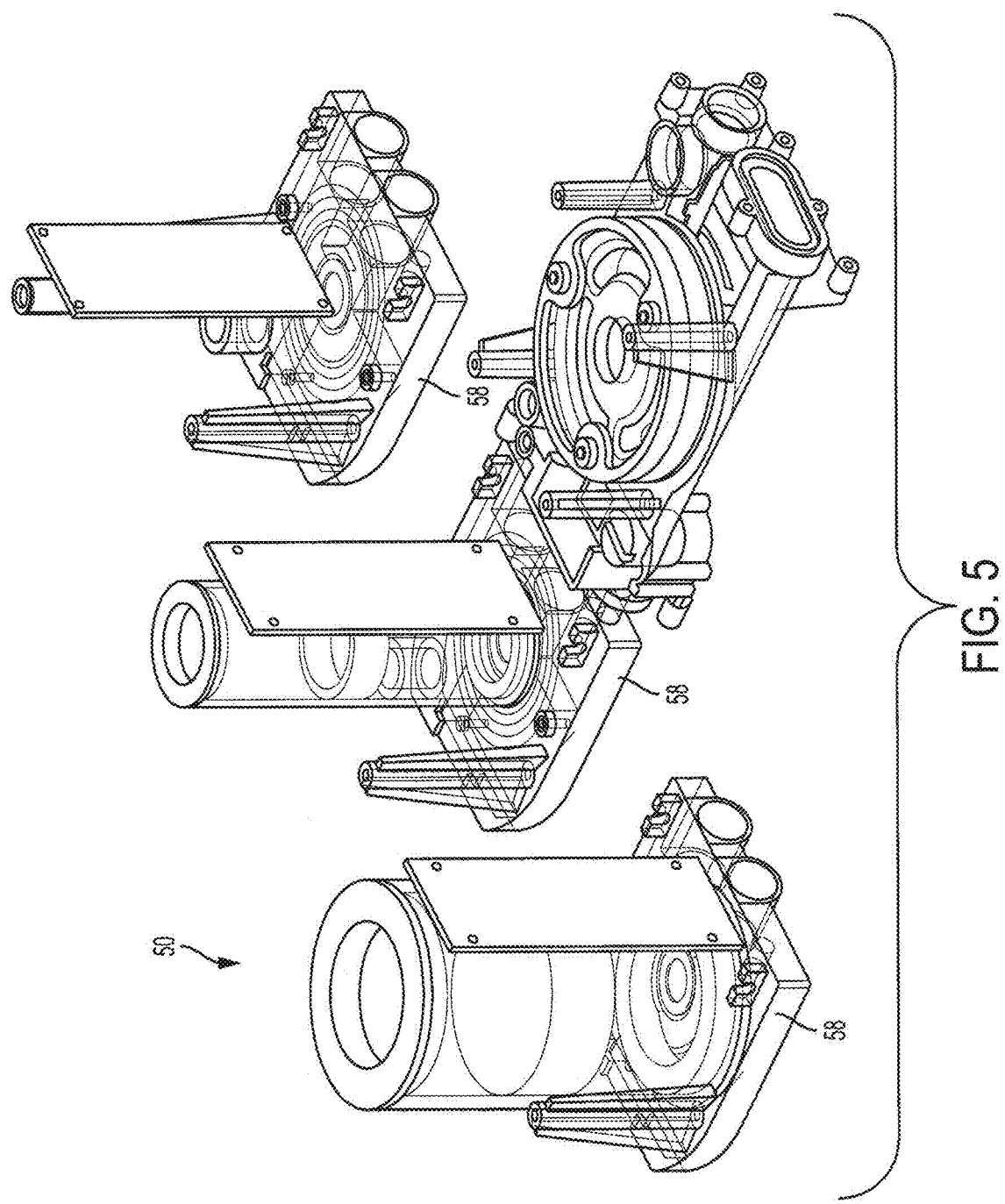
FIG. 5 illustrates removable and interchangeable flow cells having various flow rates according to the present invention.

Referring to FIGS. 4 and 5, each of the removable flow cells 50 may be characterized by a flow range that may or may not overlap with another one of the removable flow cells. The flow range may be from 0.001 L/min to 50 L/min, such as from 1 mL/min to 450 mL/min, 20 mL/min to 6 L/min and 300 mL/min to 50 L/min. The flow cell 50 may be configured to make independent measurements of the flow rate using internal calibrations such that a plurality of removable flow cells 50 characterized by particular flow ranges and/or measurement methodologies, i.e., wet flow cells and dry flow cells, and operating modes, may be used interchangeably. The wet flow cell may comprise a bubble generator such that the piston described above is replaced by a bubble having a diameter of the housing. In general, the bubble generator comprises a soap solution to generate a soap film. The soap film may be propelled by the airflow under measurement from one end of the housing to the other end of the housing. The flow rate may be determined by measuring the time for the soap film to travel from the one end to the other end. The operating modes may include one or more of a pressure drop, thermal, vortex shedding, and other flow measurement techniques.

As shown in FIG. 5, the removable flow cell 50 may comprise a top end 54 and bottom end 56. The flow tube 55 may comprise one or more openings and passageways to be in fluid communication with the rotary valve and/or variable restrictor valve. The top end 54 and/or bottom end 56 may be in fluid communication with the rotary valve and/or variable restrictor valve. The flow tube 55 may be positioned in a substantially vertical position or a substantially horizontal position for operation. The airflow calibrator may comprise a base 58 configured to engage each of the removable flow cells 50. The base 58 may comprise a flexible data communication between the base 58 and the flow cell 50. The communication may allow the flow cells 50 to have different ranges of flow rates, measurement techniques, and/or configurations and remain compatible with the operation of the base 58 in acquiring, storing and reporting flow data. The flow cell 50 may be configured to store individual cell calibration information such that another of the removable flow cells 50 may engage the base 58 while maintaining identification and calibration traceability. Identification information and calibration dates, for example, may be stored in each flow cell 50 and may be communicated to a computer system via flexible data communication to provide calibration traceability.

The piston 52 may be lightweight and have a smooth surface. For example, the piston 52 may comprise a solid material, such as graphite. The piston 52 may have a diameter to fit within the flow tube 55 to provide substantially leak proof, i.e., airtight, and frictionless movement. The piston 52 may be moveable in the first direction and the second direction. The piston 52 may be reciprocated between a first axial position and a second axial position within the flow tube 55. For example, the piston 52 may reciprocate between a first axial position adjacent the bottom end 56 of the flow tube 55 to an elevated position adjacent to the top end 54 of the flow tube 55 and back. The piston 52 may separate the flow tube 55 into an upper piston chamber located between the piston 52 and the top end 54 of the flow tube 55 and a lower piston chamber located between the piston 52 and the bottom end 56 of the flow tube 55. The direction of the piston 52 may be controlled by the rotary valve 40.

The removable flow cell may be characterized by a first pressure when the piston is moveable in a first axial direction and a second pressure when the piston is moveable in the second axial direction. The first pressure may be substantially the same as the second pressure. For example, the pressure of the removable flow cell when the piston is moving upward may be substantially equal to or equal to the pressure of the removable flow cell when the piston is moving downward. As described above, the pressure of the flow cell may be regulated by the restrictor valve. The airflow calibrator may comprise a sensor to measure the pressure of the removable flow cell. The sensor may be communicatively connected to the variable restrictor valve such that the variable restrictor valve automatically regulates the pressure of the removable flow cell based on a signal received from the sensor. The sensor may be communicatively connected to the optical sensor array such that the variable restrictor valve automatically adjusts between the first position and second position based on the axial position of the piston within the housing to regulate the pressure of the removable flow cell.

The removable flow cells according to the present invention may provide one or more of the following advantages relative to conventional flow cells: the repair and maintenance of the flow cell may be more simple and/or economical because replacement flow cells may be on-hand for use while another flow cell is being calibrated, repaired, serviced or replaced; overall system costs may be reduced because flow calibration ranges may be added to the system by adding individual flow cells that are interchangeable with the base without having to also add a dedicated main base processor; and the ability to use flow cells including new technology and/or for new applications.

Referring to FIG. 4, the optical sensor array 70 may comprise one of a transmissive linear optical sensor array and a reflective linear optical sensor array. The optical sensor array 70 may detect the position of the piston 52 within the flow tube 55 at a first time and at least one additional position within the flow tube 55 at a second time later than the first time. The optical sensor array 70 may be adjacent to the removable flow cell 50 to detect an axial position of the piston 52 within the flow tube 55. The airflow calibrator may comprise a light source, i.e., a photo emitter, (not shown) to illuminate the piston at the axial position of the piston at a first time and at least one additional axial position at a second time later than the first time. The light source may comprise a visible light source, an infrared light source, and/or an ultraviolet light source. The reflective linear optical sensor array may generally comprise an array of single point photo detectors coupled to a substrate, such as a stable epoxy/glass filled substrate and photo emitters that may be on the same side of the flow cell as the detectors.

The reflective linear optical sensor may be configured to detect and measure piston or bubble acceleration, deceleration and pulsation caused by the flow generator, e.g., the pump of the flow sampler. The piston or bubble may break the beam of light emitted by the photo emitters, and the reflective linear optical sensor may detect when the beam of light is broken. Without wishing to be bound to any particular theory, it is believed that the detection and measurement of piston or bubble acceleration, deceleration and pulsation may improve the accuracy of the flow algorithms by avoiding the periods of motion during change of the rate of the piston or bubble. The linear optical sensor may be configured to detect and measure the piston or bubble in multiple positions along the flow cell. The measurements from the multiple positions may be fit to a linear regression to provide more accurate and/or faster measurements during a single run cycle. The use of an array may increase time resolution by averaging multiple measurements as the sensor element passes successive array elements.

The reflective linear optical sensor according to the present invention may provide one or more of the following advantages: provide stable detection of the edges of the piston or bubble which is critical to accurate flow measurement since any error in edge detection is an error in the time measurement and the flow rate is the volume swept divided by the time; require little, if any, alignment of the photo emitters and detectors relative to conventional photo-interrupter configurations; improve detection that is less sensitive or insensitive to vibration or impact; and improved detection having a low sensitivity to spurious detection. The inherent alignment of the reflective sensor element may be less likely to vary with vibration, temperature change or impact relative to other interrupter configurations.

The airflow calibrator may comprise a housing (not shown). The housing may comprise any suitable material, such as, for example, but not limited to, glass, metal, ceramic, plastic, and any combination thereof. The housing may enclose the face seal valve and variable restrictor valve. The housing may be fluidly connected to the base of the removable flow cell.

Referring to FIG. 6, the flow path 30 may comprise a first flow path 32 during the upstroke of the pump of the flow sampler and a second flow path 34 during the down stroke of the pump of the flow sampler. The airflow calibrator may direct airflow from the inlet 15 to the rotary valve 40 to the flow tube 55 of the removable flow cell 50 to the rotary valve 40 and to the outlet 20 during the upstroke of the pump of the flow sampler. The airflow calibrator may direct airflow from the inlet 15 to the rotary valve 40 to the flow tube 55 of the removable flow cell 50 to the variable restrictor valve 60 to the rotary valve 40 and to the outlet 20 during the down stroke of the pump of the flow sampler. As described in more detail above, each of the rotary valve 40, removable flow cell 50, and variable restrictor valve 60 may comprise an inlet, an outlet, ports, and/or passageways to provide the flow path 30 described herein.

A method of calibrating a flow sampler may generally comprise coupling the airflow calibrator to the flow sampler. The pump of the flow sampler may draw air from the atmosphere into the inlet of the airflow calibrator. The airflow may follow the flow path from the inlet though the first port of the rotary valve to an inlet at the bottom end of the flow tube of the removable flow cell, forcing the piston to rise from a position at the bottom end of the flow tube, and exit from an outlet at the top end of the flow tube 55 of the removable flow cell 50 and to the outlet 20 during the upstroke of the pump of the flow sampler. When the piston reaches the top end of the flow tube of the removable flow cell, the rotary valve moves into the second position to cause the airflow to follow the flow path from the inlet though the second port of the rotary valve to an inlet at the top end of the flow tube of the removable flow cell, forcing the piston to lower from a position at the top end of the flow tube, and exit from an outlet at the bottom end of the flow tube 55 and through the variable restrictor valve and to the outlet during the down stroke of the pump of the flow sampler. During the descent of the piston, the variable restrictor valve maintains the back pressure of the flow tube 55. The optical sensor array measures the movement to the piston to determine the flow rate of the flow sampler as discussed above.

Implementations of the airflow calibrator system are described within the context of a device configured to perform various steps, methods, and/or functionality in accordance with aspects of the described subject matter. It is to be appreciated that an airflow calibrator system including a computing device or computer system may be implemented by one or more computing devices. Implementations of the airflow calibrator system may be described in the context of a "device configured to", wherein the term configured may be taken to mean that the device can implement computer-executable instructions that are executed to perform various steps, methods, and/or functionality in accordance with aspects of the described subject matter.

In general, a computer system or computing device may include one or more processors and storage devices (e.g., memory and disk drives) as well as various input devices, output devices, communication interfaces, and/or other types of devices. A computer system or computing device can also include a combination of hardware and software. It should be appreciated that various types of computer-readable storage media can be part of a computer system or computing device. As used herein, the terms "memory", "computer-readable storage media" and "computer-readable storage medium" do not mean and unequivocally exclude a propagated signal, a modulated data signal, a carrier wave, or any other type of transitory computer-readable medium. The airflow calibrator system may include a processor configured to execute computer-executable instructions and a computer-readable storage medium (e.g., memory and/or additional hardware storage) storing computer-executable instructions configured to perform various steps, methods, and/or functionality in accordance with aspects of the described subject matter.

Computer-executable instructions may be embodied and/or implemented in various ways such as by a computer program (e.g., client program and/or server program), a software application (e.g., client application and/or server application), software code, application code, source code, executable files, executable components, routines, application programming interfaces (APIs), functions, methods, objects, properties, data structures, data types, and/or the like. Computer-executable instructions may be stored on one or more computer-readable storage media and can be executed by one or more processors, computing devices, and/or computer systems to perform particular tasks or implement particular data types in accordance with aspects of the described subject matter.

The airflow calibrator system may implement and utilize one or more program modules. Generally, program modules include routines, programs, objects, components, data structures, etc., that perform particular tasks or implement particular abstract data types.

The airflow calibrator system may be implemented as a distributed computing system or environment in which components are located on different computing devices that are connected to each other through network (e.g., wired and/or wireless) and/or other forms of direct and/or indirect connections. In such distributed computing systems or environments, tasks can be performed by one or more remote processing devices, or within a cloud of one or more devices, that are linked through one or more communications networks. In a distributed computing environment, program modules can be located in both local and remote computer storage media including media storage devices. Still further, the aforementioned instructions can be implemented, in part or in whole, as hardware logic circuits, which can include a processor.

The airflow calibrator system may be implemented by one or more computing devices such as computers, PCs, server computers configured to provide various types of services and/or data stores in accordance with aspects of the described subject matter. Exemplary sever computers can include, without limitation: web servers, front end servers, application servers, database servers, domain controllers, domain name servers, directory servers, and/or other suitable computers.

Components of the airflow calibrator system may be implemented by software, hardware, firmware or a combination thereof. For example, the airflow calibrator system may include components implemented by computer-executable instructions that are stored on one or more computer-readable storage media and that are executed to perform various steps, methods, and/or functionality in accordance with aspects of the described subject matter.

The airflow calibrator system may include a controller, memory, additional hardware storage, input devices, and output devices. Input devices may include one or more of the exemplary input devices described above and/or other type of input mechanism and/or device. Output devices may include one or more of the exemplary output devices described above and/or other type of output mechanism and/or device, such as a display.

The airflow calibrator system may contain one or more communication interfaces that allow the airflow calibrator system to communicate with other computing devices and/or other computer systems. The airflow calibrator system may include and/or run one or more computer programs implemented, for example, by software, firmware, hardware, logic, and/or circuitry of the airflow calibrator system. Computer programs can include an operating system implemented, for example, by one or more exemplary operating systems described above and/or other type of operating system suitable for running on computing device. Computer programs can include one or more applications.

Each of the characteristics and aspects described above, and combinations thereof, may be encompassed by the present invention. The present invention is drawn to the following non-limiting aspects:

(1) An airflow calibrator comprising: an inlet in fluid communication with an outlet to define a flow path of air through the airflow calibrator; a face seal valve in fluid communication with the inlet, wherein the face seal valve includes a first port, a second port, and a third port; at least one removable flow cell in fluid communication with the face seal valve, wherein the removable flow cell has a flow range from 0.001 L/min to 50 L/min and includes a piston disposed and moveable in at least one axial direction in a flow tube; a variable restrictor valve in fluid communication with the removable flow cell and movable between at least one of a first position and a second position to control a pressure of the removable flow cell; and an optical sensor array adjacent to the removable flow cell to detect a position of the piston in the flow tube;

(2) the airflow calibrator of aspect 1, wherein the flow path through the removable flow cell has a first direction through the first port of the face seal valve and a second direction through the second port of the face seal valve, and wherein the first direction is opposed to the second direction;

(3) the airflow calibrator of aspect 1 or aspect 2, wherein the flow path has a third direction through the third port of the face seal valve, and wherein the face seal valve is not in fluid communication with the removable flow cell in the third direction;

(4) the airflow calibrator of any of aspects 1-3, wherein the piston is moveable in the first direction and the second direction, and the optical sensor array detects the position of the piston in the first direction and the second direction;

(5) the airflow calibrator of any of aspects 1-4 comprising a sensor to measure the pressure of the removable flow cell, wherein the sensor is communicatively connected to the variable restrictor valve, and wherein the variable restrictor valve automatically regulates the pressure of the removable flow cell based on a signal received from the sensor;

(6) the airflow calibrator of any of aspects 1-5 comprising a sensor to measure the pressure of the removable flow cell, wherein the sensor is communicatively connected to the optical sensor array, and wherein the variable restrictor valve automatically adjusts between the first position and second position based on the position of the piston in the flow tube;

(7) the airflow calibrator of any of aspects 1-6, wherein the removable flow cell has a first pressure when the piston is moveable in a first axial direction and a second pressure when the piston is moveable in the second axial direction, and wherein the wherein the variable restrictor valve automatically regulates the first pressure to be substantially the same as the second pressure;

(8) the airflow calibrator of any of aspects 1-7, wherein the optical sensor array comprises one of a transmissive linear optical sensor array and a reflective linear optical sensor array;

(9) the airflow calibrator of any of aspects 1-8, wherein the optical sensor array detects the position of the piston in the flow tube at a first time and at least one additional position in the flow tube at a second time later than the first time;

(10) the airflow calibrator of any of aspects 1-9 comprising a light source to illuminate the piston at the position of the piston at a first time and at least one additional axial position at a second time later than the first time, wherein the light source comprises one of a visible light source, an infrared light source, and an ultraviolet light source;

(11) the airflow calibrator of any of aspects 1-10 comprising an external pump to direct an airflow through the airflow calibrator at a flow rate to be measured by the airflow calibrator;

(12) the airflow calibrator of any of aspects 1-11 comprising a detachable base to support the removable flow cell and couple to a base supporting the face seal valve and variable restrictor valve;

(13) the airflow calibrator of any of aspects 1-12, wherein the removable flow cell comprises one of a dry flow cell and a wet flow cell;

(14) the airflow calibrator of any of aspects 1-13, wherein the wet flow cell comprises a bubble generator and wherein the piston comprises a bubble having a diameter of the flow tube; and

(15) a method of calibrating an air sampling pump using the airflow calibrator of any of aspects 1-14.

All documents cited herein are incorporated herein by reference, but only to the extent that the incorporated material does not conflict with existing definitions, statements, or other documents set forth herein. To the extent that any meaning or definition of a term in this document conflicts with any meaning or definition of the same term in a document incorporated by reference, the meaning or definition assigned to that term in this document shall govern. The citation of any document is not to be construed as an admission that it is prior art with respect to this application.

While particular embodiments have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific apparatuses and methods described herein, including alternatives, variants, additions, deletions, modifications and substitutions. This application including the appended claims is therefore intended to cover all such changes and modifications that are within the scope of this application.

What is claimed is:

1. An airflow calibrator comprising:
   an inlet in fluid communication with an outlet to define a flow path of air through the airflow calibrator;
   a face seal valve in fluid communication with the inlet, wherein the face seal valve includes a first port, a second port, and a third port;
   at least one removable flow cell in fluid communication with the face seal valve, wherein the removable flow cell has a flow range from 0.001 L/min to 50 L/min and includes a piston disposed and moveable in at least one axial direction in a flow tube;
   a variable restrictor valve in fluid communication with the removable flow cell and movable between at least one of a first position and a second position to control a pressure of the removable flow cell; and
   an optical sensor array adjacent to the removable flow cell to detect a position of the piston in the flow tube.

2. The airflow calibrator of claim 1, wherein the flow path through the removable flow cell has a first direction through the first port of the face seal valve and a second direction through the second port of the face seal valve, and wherein the first direction is opposed to the second direction.

3. The airflow calibrator of claim 2, wherein the flow path has a third direction through the third port of the face seal valve, and wherein the face seal valve is not in fluid communication with the removable flow cell in the third direction.

4. The airflow calibrator of claim 2, wherein the piston is moveable in the first direction and the second direction, and the optical sensor array detects the position of the piston in the first direction and the second direction.

5. The airflow calibrator of claim 1 comprising a sensor to measure the pressure of the removable flow cell, wherein the sensor is communicatively connected to the variable restrictor valve, and wherein the variable restrictor valve automatically regulates the pressure of the removable flow cell based on a signal received from the sensor.

6. The airflow calibrator of claim 5 comprising a sensor to measure the pressure of the removable flow cell, wherein the sensor is communicatively connected to the optical sensor array, and wherein the variable restrictor valve automatically adjusts between the first position and second position based on the position of the piston in the flow tube.

7. The airflow calibrator of claim 1, wherein the removable flow cell has a first pressure when the piston is moveable in a first axial direction and a second pressure when the piston is moveable in the second axial direction, and wherein the wherein the variable restrictor valve automatically regulates the first pressure to be substantially the same as the second pressure.

8. The airflow calibrator of claim 1, wherein the optical sensor array comprises one of a transmissive linear optical sensor array and a reflective linear optical sensor array.

9. The airflow calibrator of claim 1, wherein the optical sensor array detects the position of the piston in the flow tube at a first time and at least one additional position in the flow tube at a second time later than the first time.

10. The airflow calibrator of claim 1 comprising a light source to illuminate the piston at the position of the piston at a first time and at least one additional axial position at a second time later than the first time, wherein the light source comprises one of a visible light source, an infrared light source, and an ultraviolet light source.

11. The airflow calibrator of claim 1 comprising an external pump to direct an airflow through the airflow calibrator at a flow rate to be measured by the airflow calibrator.

12. The airflow calibrator of claim 1 comprising a detachable base to support the removable flow cell and couple to a base supporting the face seal valve and variable restrictor valve.

13. The airflow calibrator of claim 1, wherein the removable flow cell comprises one of a dry flow cell and a wet flow cell.

14. The airflow calibrator of claim 13, wherein the wet flow cell comprises a bubble generator and wherein the piston comprises a bubble having a diameter of the flow tube.

15. A method of calibrating an air sampling pump using the airflow calibrator of claim 1.

* * * * *